US006539325B1

(12) United States Patent
Numata et al.

(10) Patent No.: US 6,539,325 B1
(45) Date of Patent: Mar. 25, 2003

(54) COLOR MATCHING APPARATUS FOR AUTOMOTIVE REPAIR PAINTS

(75) Inventors: Shuhei Numata, Hirakata (JP); Takao Asaba, Tokyo (JP); Koichi Kuwano, Osaka (JP); Masayuki Osumi, Okazaki (JP)

(73) Assignees: Nippon Paint Co., Ltd., Osaka (JP); Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/456,425

(22) Filed: Dec. 8, 1999

(51) Int. Cl.[7] .............. G01D 1/00; G01J 3/46
(52) U.S. Cl. ........... 702/127; 356/402; 356/419; 356/425; 382/165; 427/190; 430/7; 523/219; 528/32
(58) Field of Search ............ 702/32, 127; 356/402, 356/405, 407, 425; 382/165; 358/1.9

(56) References Cited

U.S. PATENT DOCUMENTS

| | | | | |
|---|---|---|---|---|
| 4,692,481 A | * | 9/1987 | Kelly | 523/219 |
| 5,177,694 A | * | 1/1993 | Graham et al. | 382/165 |
| 5,668,633 A | * | 9/1997 | Cheetam et al. | 356/402 |
| 5,700,515 A | * | 12/1997 | Rodrigues | 427/190 |
| 5,776,643 A | * | 7/1998 | Hirai | 430/7 |
| 5,886,125 A | * | 3/1999 | Huybrechts | 528/32 |
| 6,108,095 A | * | 8/2000 | Graf | 356/425 |
| 6,249,348 B1 | * | 6/2001 | Jung et al. | 356/419 |
| 6,342,952 B1 | * | 1/2002 | Chan | 358/1.9 |

* cited by examiner

Primary Examiner—Kamini Shah
Assistant Examiner—John Le
(74) Attorney, Agent, or Firm—O'Melveny & Myers LLP

(57) ABSTRACT

This invention provides a color matching apparatus for automotive repair paints with which the color matching of a repair paint to an existing paint, whether containing or not containing a metallic or pearlescent pigment, can be performed with high precision in a reduced number of steps even by the novice. The apparatus of the invention comprises a computer, a color data file and a database reference system.

10 Claims, 3 Drawing Sheets

FIG. 1
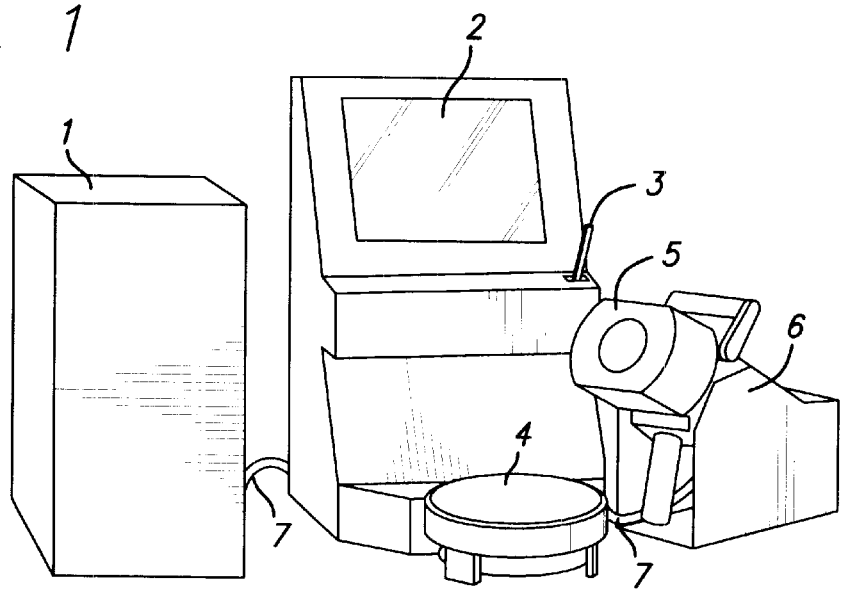
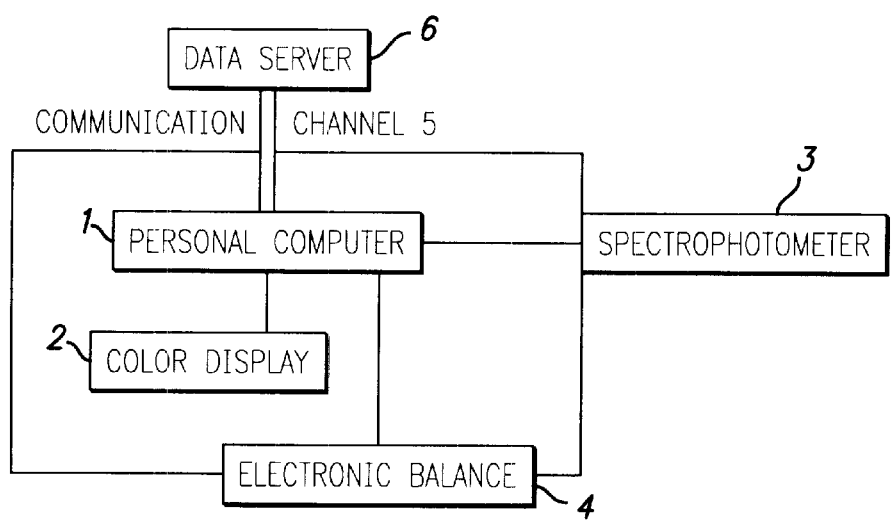
FIG. 2

COLOR MATCHING APPARATUS FOR AUTOMOTIVE REPAIR PAINTS

TECHNICAL FIELD

The present invention relates to an apparatus for the color matching of an automotive repair paint.

PRIOR ART

An automotive repair paint is used for a partial or overall recoating of the exterior of an automobile for repair or retouching. Usually in such automotive repair coating, it is necessary to reproduce a color substantially identical to the existing surface color of the automobile. Therefore, the color matching of a repair paint is a very delicate operation calling for many years of experience and much intuition.

Meanwhile, recent years have witnessed a great deal of diversification of automobiles not only in model but also in the color and kind of finish coating. Therefore, the color matching of repair paints is required to deal with an increasing diversity of coating compositions and hues.

When automotive repairing is performed as a business, it is essential to deal with each request for repair with high efficiency and provide an improved precision of repairing to thereby win the client's, satisfaction. On the other hand, to realize a greater rationalization of color matching, it is getting more and more necessary to put ingenuity in the working procedure so as to minimize dependence on skill and reduce labor and time.

In order to improve the efficiency of a repair job by reconciling the above conflicting requirements, it is keenly demanded to introduce a practically useful color matching system involving a minimum of procedural steps requiring experience and perceptual acuity and enabling any one to attain a precision color matching with high efficiency in a short time.

Such a color matching system may not meet actual needs unless it is able to deal with both a solid paint and a metallic or pearlescent pigment containing paint(briefly a metallic or pearlescent paint). Moreover, such a system will not be practically useful if it is not easy to manipulate or work with.

The conventional computer color matching technology for determining an adequate formulation for a paint containing a metallic or pearlescent pigment comprises computing a colorant formulation conforming to a target color under a given coating parameter setting by convergence using the Kubelka-Munc optical density equation, determining a metallic or pearlescent pigment formulation necessary to reproduce a desired luster or hue by empirical judgement using available information, comparing a colored sample prepared with a paint of the formulation thus computed with the chromaticity and luster of a target color and adjusting the difference by repeated correction computation and visual evaluation aided by experience until an agreement in luster and hue has been finally obtained.

Japanese Kokai publication H2-184369 discloses an automatic weighing and color matching system comprising a computer unit and, connected thereto via a channel, a terminal unit and an automatic batching unit. However, this technology is such that color matching data are supplied from a master file on a computer and the system is not equipped with a mechanism for the color matching computation for paint formulation or a correction computation and is not sufficient in the precision and versatility of color matching.

Japanese Kokai publication H2-292699 discloses a weighing and color matching system comprising a computer unit and, as connected thereto by a telephone line, a MODEM and a calorimeter. Japanese Kokai publication H8-332438 discloses a weighing and color matching apparatus comprising a computer unit, a weighing station, a calorimetric station, a touch screen and a touch pen. With those technologies, however, it is a master computer connected to a public communication line that computes a paint formulation from measured data of a color sample and performs a correction computation and said computer unit processes the color matching formulation based on the results of computations received from said master computer via the public communication line. As such, this weighing and color matching apparatus does not have a system of its own for performing a color matching computation or a correction computation needed for paint formulation. Therefore, the processing speed is not as high as desired and the local data accumulated individually in the work place can hardly be reflected in the color matching computation, thus being not adequate enough in the quality of operation and workability. In addition, as far as chromatic coatings containing metallic or pearlescent pigments are concerned, a color matching technique taking the influence of metallic or pearlescent pigments on the output color into consideration has not been implemented as yet, with the result that in order to reproduce the desired hue and luster, it is necessary to back up the system with experience and intuition. For these reasons, the prior art cannot be sufficiently relied on for the purpose of improving the efficiency and rationality of a formulating operation.

Japanese Kokai publication H7-150081 discloses a method for reproducing a paint film color by computing the formulating amounts of paint component materials inclusive of colorants and metallic or pearlescent pigments, which comprises using known correlations of the amounts of components inclusive of colorants and metallic or pearlescent pigments with reflectance and carrying out a computational to obtain characteristic values corresponding to a new reflectance by interpolation using an inverse estimation technique. However, since this technique is a method of determining a relevant formulation by interpolation from known reflectance-characteristic value correlations, it is difficult to provide for a sufficient degree of freedom in formulation particularly in the case of paint film colors containing metallic or pearlescent pigments. Furthermore, what is disclosed is no more than a computer-aided color matching technology and no information is disclosed about a practically useful system which can be applied to actual automotive repairing for solving the above-mentioned problems.

Thus, in the prior art, particularly in connection with metallic or pearlescent paint colors, the computational means for finding a formulating ratio of metallic or pearlescent pigment to colorant pigment reproducing the desired hue and luster has not been implemented in a computer color matching system and the versatility in the formulation which can be dealt with is limited. Moreover, in order to obtain a formulation sufficiently matching the target color in both hue and luster, the computer color matching routine must be repeatedly executed or the trial coating be performed repeatedly on a trial-and-error basis relying on visual assessment and experience. This is because, in order to reproduce the desired hue and luster, the influence of metallic or pearlescent pigments on chromaticity must be taken into consideration, while the hue is influenced by the formulation of colorants and the coating thickness, among other factors, so that the computation must be carried out taking all such factors into account.

Particularly in the color matching of an automotive repair paint, unlike creative color designs and other jobs, a strict agreement with the currently prevailing coated color of an automobile to be repair-finished is required. In many cases, the prevailing coated color is not the same as the original color of a new automobile because of the fading and discoloration due to aging so that the color matching must be performed not based on the factory formulation data of the paint used on the automobile to be repair-finished but also taking the actually measured data on the automobile to be repaired into consideration.

Therefore, in the case of metallic or pearlescent colors which are increasingly used in those years, it is extremely difficult, even for a well-experienced specialist, to find a formulation giving a good match to a target color in both hue and luster. Thus, many trials are required until a necessary formulation has been attained so that the color matching takes much labor and time, thus increasing the cost of repairing. Moreover, even if many trials are carried out, there is no guarantee that the objective formulation can be certainly obtained. In addition, in order to construct a color matching system which should be practically useful, measures must be instituted to insure said accuracy of color matching and correct for the above-mentioned influence of fading or discoloration. Thus, the technical problems which must be solved for the establishment of a practical color matching system suited to automotive repair jobs remain yet to be solved.

In view of the above state of the art, the present invention has for its object to provide a color matching apparatus for automotive repair paints which enables even unexperienced personnel to perform color matching of a repair paint, whether containing a metallic or pearlescent pigment or not containing a metallic or pearlescent pigment, in a reduced number of steps and with high precision in a short time.

SUMMARY OF THE INVENTION

The present invention relates to a color matching apparatus for automotive repair paints which comprises a computer, a color display, a spectrophotometer capable of color measurement at a plurality of viewing angles, and an electronic balance wherein said color matching apparatus is provided, as installed on said computer, a color matching computation system capable of performing a color matching computation for an automotive repair paint, a color data file and a database reference system capable of referring to a remote database server for retrieval of at least paint component base data and automotive top coat formulation base data via a communication channel and, in response to a computation command is capable of carrying out a color matching computation for an automotive repair paint either containing or not containing a metallic or pearlescent pigment on the basis of calorimetric data obtained from said spectrophotometer and color data in said color data file and outputting the result of said computation to said color display and electronic balance, with said, apparatus, upon connection to the database server via said communication channel, being enabled to retrieve at least said paint component base data and automotive top coat formulation base data and use them in said color matching computation. The present invention is now described in detail.

BRIEF DESCRIPTION OF THE DRAWINGS

FIG. 1 is a sketch showing the color matching apparatus according to the present invention.

FIG. 2 is a schematic diagram showing the construction of the color matching apparatus according to the present invention.

FIG. 2 is a schematic diagram showing the color matching computational routine used in the color matching apparatus according to the present invention.

LEGENDS

Figure 3:
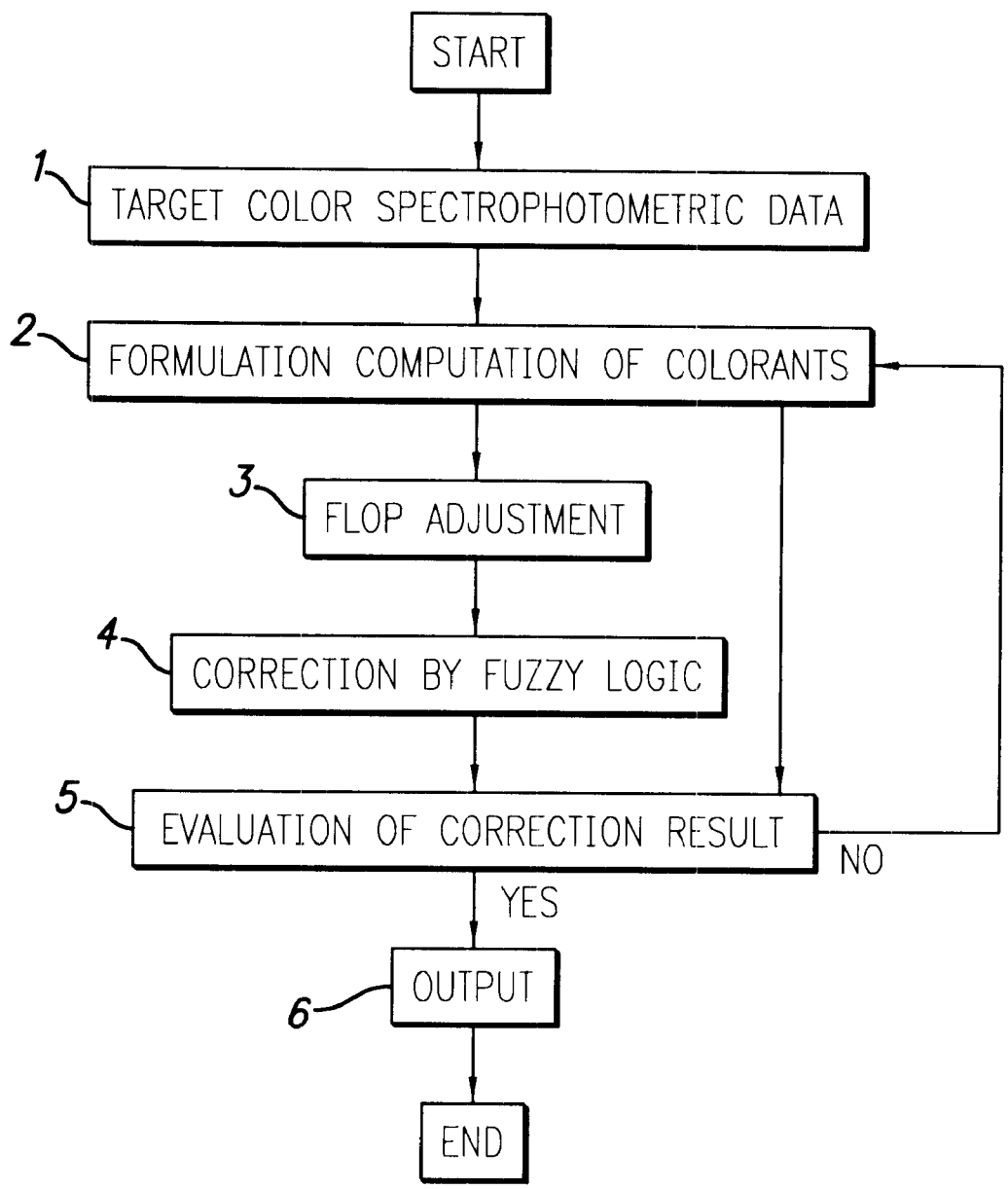

1. Computer
2. Touch-panel display
3. Touch pen
4. Electronic balance
5. Color measuring unit
6. Docking station
7. Lead cable

DETAILED DESCRIPTION OF THE PREFERRED EMBODIMENTS OF THE INVENTION

The color matching apparatus for automotive repair paints according to the present invention comprises, typically as illustrated in FIG. 2, a personal computer 1, a color display 2, a multiple-angle spectrophotometer 3 and an electronic balance 4. This color matching apparatus comprises, as installed on said personal computer, a color matching computation block, a color data file and a database reference block capable of referring to a remote database server 6 via a communication channel 5 to retrieve at least paint component base data and automotive top coat formulation base data. Those component blocks are now described in detail.

(1) Color Matching Computation Block

The flow of color matching computation in the present invention can be typically represented by the block diagram shown in FIG. 3. First, the multiple angle spectral reflectance values of a target color are measured (Step 1). Then, base date of colorant spectral reflectance values are read from the color data file not shown and the formulation of a plurality of colorants to be used is calculated (Step 2). As regards a paint not containing a metallic or pearlescent pigment, it is inquired if the predicted reflectance based on the resultant formulation falls within a predetermined range of target color (Step 5) and a computation for the correction necessary for conversion into said range is repeated and the result is outputted (Step 6). On the other hand, for a paint containing both a colorant pigment and a metallic or pearlescent pigment, the formulation of colorant pigments is determined (step 2) and with the effect of addition of the metallic or pearlescent pigment being taken into account (Step 3), a correction by fuzzy deduction is performed using spectral reflectance data at a plurality of viewing angles as generated with a plurality of coated samples prepared using varied colorant-metallic or pearlescent pigment formulations and varied coating parameters and the predicted reflectance value thus obtained is compared with the reflectance of the target color (Step 5). If the difference from the target color is greater than a predetermined value, a correction computation for necessary convergence is repeated and the result is outputted (Step 6).

When the Target Coated Color is the Color of a Solid Color Paint

When the target coated color is the color of a solid color paint, the spectral reflectance of the target color of the automobile to be repaired is measured and while reading the base data spectral reflectance values of coated plates from the color data file (to be described hereinafter) and computing the predicted spectral reflectance corresponding to the formulation of a plurality of colorants to be used in a given ratio from the Kubelka-Munc optical density equation described below, a formulating computation is carried out. This predicted spectral reflectance is compared with the reflectance of the target color and if the difference from the target color is greater than a predetermined range, a convergence computation is repeated until the result has fallen within the necessary range.

The Kubelka-Munc optical density equation, which is applied here, is as follows.

$$(K/S)_\lambda = (1-R_\lambda)^2/2R_\lambda \ (0 < R_\lambda < 1)$$

where $(K/S)_\lambda$ represents the Kubelka-Munc optical density at wavelength $\lambda$ and $R_\lambda$ represents the reflectance at wavelength $\lambda$. Using the above Kubelka-Munc optical density equation, the spectral reflectance as the base data in said color data file is transformed to the ratio of absorption coefficient K to scattering coefficient S, that is K/S. Then, the optical density on mixing is determined using the two-constant method according to Duncan's theory of color mixing and further transformed to a reflectance. In this manner, the predicted spectral reflectance corresponding to a given formulation can be computed.

To improve the prediction accuracy in the above procedure, a transformation to ideal reflectance may be performed using Sanderson's equation to correct for the influence at the boundary between the resin layer and the air layer. Then the above theoretical expression of color mixing may be employed.

In the above corrective computation, the iterative computation technique according to Newton-Raphson's formula can be used and a convergence computation can be carried out by the metameric method monitoring!the difference from a target using the tristimulus values XYZ and coordinates L*a*b* or the isometric method in which the square sum of the difference from the target reflectance is evaluated.

When the target color is that of a solid color paint, a repair paint matching the target color can be formulated by the above process.

When the Target Color is the Color of a Metallic or Pearlescent Paint

On the other hand, when the target color is the color of a metallic or pearlescent paint, the color matching must deal with both a colorant pigment and a metallic or pearlescent pigment. In order to attain an agreement with the target color in both hue and luster, the formulation of the colorant and luster components is determined as follows.

(i) Using a spectrophotometer capable of color measurement at a plurality of viesing angles, the spectral reflectances of the target coated color corresponding to a plurality of illuminating angle-viewing angle correlation are measured.

(ii) The formulating ratio of the colorant pigment to the metallic or pearlescent pigment which will match the distribution of measured spectral reflections is computed by performing a predictive computation of expected spectral reflectance from the formulation.

In the above step (i), the target color of a film containing the metallic or pearlescent pigment is measured with a spectrophotometer capable of colorimetric determination at a fixed illuminating angle of observing light and a plurality of viewing angles, for example 3~4 or more directions inclusive of the highlight direction, front direction and shade direction, i.e. a multiple-angle spectrophotometer or a goniospectrophotometer. The multiple-angle spectrophotometer and goniospectrophotometer mentioned above are capable of color measurement at a fixed illuminating angle of observing light and a plurality of viewing angles. Therefore, the resulting spectral reflectance R can be generally represented by the following expression.

$$R = R(\theta_{in}, \theta_{out}, \lambda)$$

where $\theta_{in}$ represents the illuminating angle with the direction normal to the specimen surface, $\theta_{out}$ represents the viewing angle with the direction normal to the specimen surface, and $\lambda$ represents wavelength.

Particularly when the viewing angle $\theta_{out}$ is close to the illuminating angle of observing light $\theta_{in}$, the specular reflection component exerts a significant influence. This tendency is particularly pronounced for a portable type spectrophotometer in which the distance of the illuminant source position and viewing position from the specimen surface is small relative to the illuminated area of the specimen. In such cases, the interfering stray light component is measured using a perfect mirror surface reflector beforehand and a correction is made. The perfect mirror surface reflector is preferably an optical plane mirror obtainable by the vacuum vapor deposition of aluminum on a glass plate having an extremely flat and smooth surface.

In the above step (ii), in order to compute the predicted spectral reflectance on the mixing of a colorant with a metallic or pearlescent pigment in a given ratio, the base data spectral reflectance Rb of the metallic or pearlescent pigment and the base data spectral reflectance Rg measured for the colorant mixed with the metallic or pearlescent pigment are stored beforehand in a computer memory. Those base data are expressed as follows.

$$Rb = Rb(\theta, \lambda, x)$$

$$Rg = Rg(\theta, \lambda, x, y)$$

where $\theta$ represents the viewing angle; x represents the concentration of a metallic or pearlescent pigment; y represents the concentration of a colorant; and $\lambda$ represents wavelength.

In the present invention, said base data spectral reflectance Rb of a metallic or pearlescent pigment and said base data spectral reflectance Rg measured for a colorant admixed with the metallic or pearlescent pigment are preferably the values corrected for said stray light, the surface reflectance of the paint vehicle resin, and the influence of the internal mirror surface reflectance of the resin.

Furthermore, the measured spectral reflectances Rb and Rg of a coating containing a metallic or pearlescent pigment are apt to exceed 100% in case the viewing angle is close to specular reflection. Therefore, in the present invention, said Rb and Rg values are preferably determined by applying the orientation-trap model. Thus, in the interior of the paint layer, the illuminating light is scattered at various angles depending on the form and orientation of the metallic or pearlescent pigment and the coating conditions used. Moreover, the illuminating light incident on the gaps of the metallic or pearlescent pigment is trapped in the gaps. By taking those factors into account, the ideal spectral reflectance $Rb_{true}$ is expressed as follows.

$$Rb_{true}(\theta, \lambda, x) = I_0(\theta, \lambda)/I_i(\lambda) = C(\theta, \lambda) \times [1 - Tr(\lambda, x)] \times R_m(\theta, \lambda)$$

where $I_i(\lambda)$ represents the incident energy of observing light at wavelength $\lambda$; $I_0(\theta, \lambda)$ represents the energy of observing light received at viewing angle $\theta$ and wavelength $\lambda$; $C(\theta, \lambda)$ represents the scattering orientation function of light by metallic or pearlescent pigment; $Tr(\lambda, x)$ represents the efficiency of trapping of observing light at metallic or pearlescent pigment concentration x; $R_m(\theta, \lambda)$ represents the intrinsic reflectance of metallic or pearlescent pigment. The ideal spectral reflectance $Rg_{true}$ with respect to Rg can be derived in the same way.

The spectral reflectance for a formulation containing a plurality of metallic or pearlescent pigments is preferably determined beforehand as the spectral reflectance $Rb_{true,M}$ from said ideal spectral reflectance $Rb_{true}$, as follows. Thus, as the relative values for a staindard metallic or pearlescent pigment, the orientation function $C_s(\theta, \lambda)$ and trap effect $Tr_s(\lambda, x)$ are determined and using those values, the intrinsic reflectance of the standard metallic or pearlescent pigment is computed from the ideal reflectance $R_{true,s}(\theta, \lambda, x)$ of the standard metallic or pearlescent pigment $R_{true,s}(\theta, \lambda, x)$.

$$R_{ms}(\theta, \lambda, x) = R_{true,s}(\theta, \lambda, x)/C_s(\theta, \lambda) \times [1 - Tr_s(\lambda, x)]$$

where $R_{ms}(\theta, \lambda, x)$ represents the intrinsic reflectance of the standard metallic or pearlescent pigment. Based on the result, the spectral reflectance for a formulation containing n kinds of metallic or pearlescent pigments is computed by means of the following equation.

$$Rb_{true,M}(\theta, \lambda, x_i, x_2 \ldots x_n) = \Sigma[C_{s,j}(\theta, \lambda, x_j) \cdot x_j]/\Sigma x_j \times [1 - \Sigma[Tr_{s,j}(\lambda, x_j) \cdot x_j]/\Sigma x_j] \times \Sigma[R_{ms,j}(\theta, \lambda, x_j) \cdot x_j]/\Sigma x_j$$

where $Rb_{true,M}(\theta, \lambda, x_1, x_2 \ldots x_n)$ represents the spectral reflectance of a formulation containing n kinds of metallic or pearlescent pigments at the levels of $x_1, x_2 \ldots x_n$. The sum is taken up to n for j. The other symbols are as defined hereinbefore.

From the base data spectral reflectance Rb after said correction and the base data spectral reflectance Rg for the colorants mixed with metallic or pearlescent pigments, the absorbance A due to the colorants can be found as follows.

$$A = Rg(\theta, \lambda, x, y) - Rb(\theta, \lambda, x)$$

When the colorants are high in transmissivity and low in scattering power, the Lambert-Beer law may be assumed to hold.

$$Abs(\theta, \lambda, x, y) = -\log(T)$$

where Abs $(\theta, \lambda, x, y)$ represents the absorption spectrum for a colorant mixed with a metallic or pearlescent pigment; T represents transmittance. The relation of absorbance and transmittance is $T = A - 1$. Here, taking the light path length within the coating layer and the intrinsic absorption spectrum of the colorant into consideration, the following equation holds.

$$Abs(\theta, \lambda, x, y) = L(\theta, x) \cdot y \cdot Abs(\lambda)$$

where $L(\theta, x)$ represents the light path length with the metallic or pearlescent pigment in the coating layer taken into consideration; $Abs(\theta, \lambda, x, y)$ is as defined above; $Abs(\lambda)$ represents the intrinsic absorption spectrum of the colorant. The above $L(\theta, x)$ value is determined for the metallic or pearlescent pigment using a standard colorant beforehand.

Based on the above discussion, the absorption spectrum corresponding to a formulation of n kinds of metallic or pearlescent pigments and m kinds of colorants can be expressed as follows.

$$Abs_M(\theta, \lambda, x_1, x_2 \ldots x_n, y_1, y_2 \ldots y_m) = \Sigma L_i(\theta, x_i)/\Sigma L_i \cdot \Sigma [y_j \cdot Abs_j(\lambda)]$$

where the symbols have the same meanings as defined above. The sum is taken up to n for i and up to m for j. Therefore, the predicted spectral reflectance can be computed from said absorption spectrum $Abs_M(\theta, \lambda, x_1, x_2 \ldots x_n, y_1, y_2 \ldots y_m)$ with said Lambert-Beer law taken into consideration. In FIG. 3, the process 2 represents this step.

The degree of random reflection depends on the level of addition of a metallic or pearlescent pigment and, moreover, the spectral reflectances at different viewing angles are varied. Usually, as the density of a metallic or pearlescent pigment in the colored layer is increased, the scattering power per unit area within the colored layer is increased, so that the random reflection due to the metallic or pearlescent pigment is also increased to augment the luster. However, as the scattering power ultimately reaches a saturation, the luster will not be increased any more even if a further amount of the metallic or pearlescent pigment is added. Therefore, the relationship of the change in luster to the level of addition of the metallic or pearlescent pigment is proportional up to said saturation, thus being a monotone increasing function with a positive linear differential and a negative quadratic differential. Therefore, the base spectral reflectance data at each illuminating angle-viewing angle correlation are generated using gradually increased amounts of the metallic or pearlescent pigment beforehand and utilizing this relation f between the concentration x of the metallic or pearlescent pigment and the flop value F representing the luster, the flop value F corresponding to the concentration x of the metallic or pearlescent pigment is estimated according to the following formula.

$$F = f(x)$$

where f represents an estimation function of flop value. In FIG. 3, the step 3 represents this step.

In this case, the estimation function of flop value is determined from the correlations of the flop value and the amount of the metallic or pearlescent pigment as determined discretely beforehand. For this correlation, the linear interpolation method, for instance, can be used. In order to increase the accuracy of this interpolation, the flop value F is preferably transformed to the flop value $F_1$ using a monotone increasing function with a positive linear differential and a quadratic differential close to zero with respect to the concentration x of the metallic or pearlescent pigment. Since this transformed flop value $F_1$ is highly proportional to the level of addition of the metallic or pearlescent pigment, the additivity of transformed flop values $F_1$ for a formulation containing a plurality of metallic or pearlescent pigments is more ready to hold true so that the accuracy of estimation of the flop value for such a formulation containing a plurality of metallic or pearlescent pigments is improved.

Thus, in accordance with the present invention, in determining a paint formulation containing colorants and metallic or pearlescent pigments, the formulation giving the target spectral reflectance and target flop value can be predicted with the change in spectral reflectance at each viewing angle, which occurs with a change in the level of addition of metallic or pearlescent pigments, being duly reflected in the predictive computation.

In the present invention, the result of a predictive computation, thus obtained theoretically, is further corrected by a fuzzy logic to improve the precision of color matching. This fuzzy technique is as follows. Thus, using the goniospectral reflectance or multiangle spectral reflectance data generated beforehand using a plurality of coated plates varied in the formulation of colorants and metallic or pearlescent pigments and in coating conditions as stored in the computer memory a fuzzy logic is employed as a computation means to correct for the difference from the above theoretically computed prediction and thereby enhance the accuracy of color matching. In FIG. 3, the step 4 represents this operation. This process is now described in detail.

In the present invention, it is a general objective to determine the formulation of colorants $x_1, x_2, x_3, \ldots x_1$, white pigment $x_w$, and metallic or pearlescent pigments $y_1, y_2, y_3 \ldots y_j$ which will give the target spectral reflectance R and flop value F under a given coating parameter setting, for example a coating thickness of t. Therefore, if the predictive computation of the spectral reflectance and flop value for the formulation of colorants, white pigment and metallic or pearlescent pigments is performed accurately under said coating thickness condition, the accuracy of the formulation computation will be improved. Thus, as mentioned above, the gonio-pectral reflectance or multiangle spectral reflectance data are generated using a plurality of coated plates serially varied in the relative formulation of colorants and metallic or pearlesent pigments beforehand and those reflectance data and the coating conditions used in the preparation of said coated plates are stored as base data in the computer memory. Then, the spectral reflectance value obtained by a predictive computation based on said formulation and coating condition data generated using coated plates and stored in the memory is compared with the predicted spectral reflectance value theoretically computed as above and a correction is made for the difference between the two values by fuzzy deduction over the entire range of measuring wavelength.

Thus, assuming that the spectral reflectance R is $$R(\theta, \lambda, x_1, x_2 \ldots x_n, x_w, y_1, y_2 \ldots y_m, t) - Rt(\theta, \lambda, x_1, x_2 \ldots x_n, x_w, y_1, y_2 \ldots y_m, t) + R_{cor}(\theta, \lambda, x_1, x_2 \ldots x_n, x_w, y_1, y_2 \ldots y_m, t),$$

a correction function $R_{cor}$ for the reflectance at wavelength $\lambda$ is computed by fuzzy deduction. In the above expression, $x_n$ represents the concentration of the nth colorant; $x_w$ represents the concentration of the white pigment; $y_m$ represents the concentration of the mth metallic or pearlescent pigment; t represents the coating thickness; Rt represents the predicted spectral reflectance at wavelength $\lambda$ as theoretically obtained as above.

Figure 4:
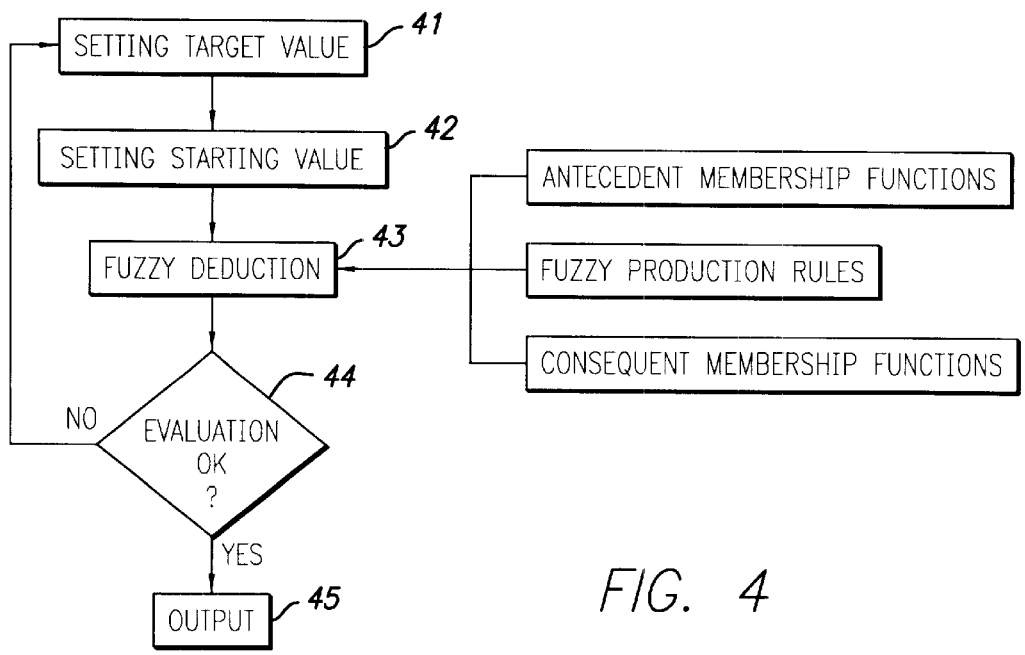
FIG. 4 is a block diagram showing the fuzzy logic algorithm of the color matching apparatus according to the present invention.

FIG. 4 shows a fuzzy deduction block diagram according to the present invention. In fuzzy deduction, fuzziness, i.e. ambiguity, is defined using a membership function according to a fuzzy theory of sets. For application, a fuzzy production rule is defined using this membership function. This fuzzy production rule consists of an antecedent clause (IF clause) and a consequent clause (THEN clause) and is generally expressed as follows. For brevity, the following expression shows the case in which the antecedent clause consists of 2 propositions and the consequent clause consists in 1 output.

$R_i$: if $a_1$ is $A_{i1}$ and $a_2$ is $A_{i2}$ then $b$ is $B_i (i=2 \ldots n)$ where $R_i$ represents the ith fuzzy production rule, $a_1$ represents the antecedent proposition 1; $a_2$ represents the antecedent proposition 2; $A_{i1}$ represents the ith membership function of antecedent proposition 1 (fuzzy label); $A_{i2}$ represents the ith membership function of antecedent proposition 2 (fuzzy label); b represents the concept of the consequent clause; $B_i$ represents the ith membership function of the consequent clause (fuzzy label); n represents the number of membership functions (fuzzy labels).

In the determination of said correction function $R_{cor}$, the antecedent clause of the production rule consists of the kind of colorant, the kind of metallic or pearlescent pigment, and coating thickness and the consequent clause consists in the correction value.

The fuzzy label of the antecedent clause for the colorant, white pigment, or metallic or pearlescent pigment takes the expression system of "much" and "little", each modified by the degree. The coating thickness t may be a measured value or a suitable index, for example a bar coater number. By presupposing an expected coating thickness range and dividing it either at equal or unequal intervals, fuzzy labels are established. As to the metallic or pearlescent pigment, a maximum level of addition is presupposed and the dimension is preferably divided either at equal or unequal intervals for the establishment of fuzzy labels. Since the sum total of the colorants and white pigment is always equal to 100, it is sufficient to take only the colorants into consideration. As to the colorants, the formulation information can be expressed in a coordinate system representing the total formulating amount of all the colorants and the formulating ratios of the respective colorants. For example, when 3 kinds of colorants are involved, their correlations can be expressed in a trigonal prismatic coordinate space defined by the coordinate representing the total formulating amount and the coordinates representing the formulating ratios of the respective colorants, respectively, based on the total formulation. Since the total of the formulating ratios lies within the range of 0~100, this dimension can be divided by n. The dividing interval is preferably varied exponentially, dense in the pale color region and sparse in the dark color region.

The fuzzy label of the consequent clause represents the magnitude of difference between the optical density calculated from the measured spectral reflectance of a coated plate prepared under certain conditions and the optical density theoretically calculated from the. conditions of preparation. For example, the ratio of the theoretically computed optical density at wavelength $\lambda$ to the measured optical density at wavelength $\lambda$ is taken and the presupposed range of this value is divided by n either at equal or unequal intervals to define the membership functions of the consequent clause. This division is preferably made in such a manner that it is dense where said ratio is close to 1.0 and sparse around both extremes of the presupposed range.

Those fuzzy labels can be summarized as follows. The following are typical fuzzy labels at wavelength $\lambda$ in a simplified case where 3 colorants and one metallic or pearlescent pigment are involved.

$a_1^0 = x_1/\Sigma x_i$ (the observed percentage of the concentration $x_1$ of $1^{st}$ colorant based on the total amount of colorants.

The sum of i up to 3)

$a_2^0 = x_2/\Sigma x_i$ (the observed percentage of the concentration $x_2$ of $2^{nd}$ colorant based on the total amount of colorants.

The sum of i up to 3)

$a_3^0 = \Sigma x_i/100$ (the observed magnitude of the formulation of all colorants. The sum of $i$ up to 3)

$a_4^0 = R$ (the transformed reflectance of under coating or substrate at $\lambda$)

$a_5^0 = t_0/t_{max}$ (the ratio of film thickness to presupposed maximum film thickness $t_{max}$)

$a_6^0 = y_g/y_{max}$ (the ratio of the level of addition of the metallic or pearlescent pigment to its presupposed maximum level of addition $y_{gmax}$)

$b^0 = R\lambda_T/R\lambda_R$ (the ratio of the measured optical density $R\lambda_R$ at wavelength λ to the theoretical optical density $R\lambda_T$ at wavelength λ)

In the fuzzy deduction, each concept in the antecedent clause is fuzzified using the membership function based on the difference between the target value and the retrieved value. Then, using a predetermined fuzzy production rule, it is decided what measure is needed to cope with the situation; for example, if the amount of a colorant is slightly too large, the amount of the particular colorant should be reduced. Then, the membership function of the consequent clause is selectively applied. From the function so applied, the amount of colorant to be corrected is determined. This process is called defuzzification. In the present invention, the conditions used in the preparation of coated plates prepared beforehand and the measured reflectance values are stored in a computer memory and in order that an exact fuzzy output of the consequent clause may be obtained using the stored information, adjustment of the consequent clause membership function and adjustment of the fuzzy production rule are carried out. In this case, the computation is performed by a defuzzification technique using the simple height method. In this simple height method, the membership function does not have a spread in the dimension of consequent clause concept b but becomes a mere function of the position on the b-axis and its height. The fuzzy logic is then as follows.

$$B^0(b) = [\omega_1 \vee B_1(b)] \vee [\omega_2 \hat{} B_2(b)] \vee \ldots [\omega_n \hat{} B_n(b)] b^0 = \Sigma B^0(b) b / \Sigma B^0(b)$$

where $B^0$ represents a function of the result of deduction of the consequent clause membership function; $B_1$ represents the ith consequent clause membership function; $\omega_1$ represents the degree of fit of the ith rule comprising the logical product of the ith fuzzy label for all the antecedent propositions; $b^0$ represents the output obtainable by defuzzification of the deduction output; and b represents the concept of the consequent clause.

Adjustment of the consequent clause membership function and that of the fuzzy production rule are carried out as follows. Thus, if only one antecedent data exists in the same cell within the fuzzy label space, the consequent clause membership function $B_1$ is set at height 1. The fuzzy production rule is adjusted, assuming that the particular cell has fired, in such a manner that $B_1$ will result from the logic of the antecedent clause. When a plurality of antecedent data exists in the same cell, the value of $B_1$ and the corresponding fuzzy production rule are set by extrapolation in the neighborhood cells where the respective data will fire.

In the cell which did not fire, the fuzzy production rule of the cell which fired is set by interpolation or extrapolation.

The flop value F can be written:

$$F(x_1, x_2 \ldots x_n, x_w, y_g, t) = Ft(x_1, x_2 \ldots x_n, x_w, y_g, t) + F_{cor}(x_1, x_2 \ldots x_n, x_w, y_g, t)$$

In this case, too, a predicted flop value F can be accurately computed by determining the flop correction function $F_{cor}$ by fuzzy deduction. In the above expression, $x_n$ represents the concentration of the nth colorant; $x_w$ represents the concentration of a white pigment, $y_g$ represents the concentration of a metallic or pearlescent pigment; t represents a coating thickness; Ft represents the flop value obtained theoretically as above.

Thus, it is possible to construct a deduction mechanism for correcting the result of the above theoretical computation at wavelength λ with measured optical density, and in accordance with the present invention, even when data generated with a multiangle spectrophotometer are used, the accuracy and time of a color match computation for achieving the target color and objective flop value can be dramatically improved.

(2) Color Data File

In the present invention, a color data file is installed on said computer. The color data file mentioned just above comprises at least a colorant base data file, a metallic or pearlescent pigment base data file, a white pigment base data file and a learning performance data file.

The colorant base data file, metallic or pearlescent pigment base data file and white pigment base data file mentioned above comprise the formulating amounts of colorants, metallic or pearlescent pigments and white pigment and the corresponding spectral reflectance data in the visible wavelength region at various angles. The spectral reflectance data mentioned above may be the weighted average spectral reflectance values at a plurality of viewing angles or the measured values generated by illuminating an observing light beam at an incident angle of 45° with the direction normal to the specimen surface and viewing the light at 3 or 4 different viewing angles, for example 20°, 45°, 75° and 110° with the direction of specular reflection. Measured data generated using a goniospectrophotometer can be likewise employed.

The learning performance data file mentioned above comprises the multiangle spectral reflectance or goniospectral reflectance data of coated specimens prepared using a plurality of colorant-metallic or pearlescent pigment formulations and the coating conditions used in the preparation of said samples, and is used in fuzzy correction computation.

In the present invention, said color data file can be connected via a communication channel to a remote paint formulation database server for retrieval of at least paint component base data and automotive top coat base data so that they may be utilized in said color matching computation. By way of illustration, in the color matching computation, the fading of the automobile to be repair-coated can be evaluated by using the automotive top coating formulation data and colorimetric data retrieved from the database server. Moreover, in the color matching computation, the automotive top coating formulation data and calorimetric data obtained from the database server can be utilized as the information for improving the precision and speed of the color matching computation.

For these purposes, the computer in the present invention is equipped with a database reference system for referring to the database server through a communication channel to retrieve at least the paint component base data and automotive top coat base formulation data. The connection to said database server is effected by using a communication means by which said system can be connected to the server. The communication means mentioned above may for example be a modem and a communication software.

Since, in the present invention, said color, matching computation system for carrying out a color matching computation for an automotive repair paint either containing or not containing a metallic or pearlescent pigment and said color data file are installed on the computer, the result of a color matching computation after correction with accumulated reference data obtained by execution can be outputted in response to a computation command in a short time, for example within 3~60 seconds, and in the case where said correction is not required or no metallic or pearlescent pigment is contained, the result of the color matching computation can be outputted in a still shorter response time, for example within a few seconds. Furthermore as the computer is connected to a database server through a communication channel, the base data on colorants land metallic or pearlescent pigments, fading information and automotive top coat formulation base data can be retrieved on line and, where necessary, the computer data can be updated.

The database server mentioned above has an automotive repair paint formulation base information database. This paint formulation database is preferably a database in which master formulations and color data inclusive of fading information by type of automobile on the market have been entered.

The type of computer which can be used in the present invention is not particularly restricted but may for example be a personal computer. The preferred personal computer is one equipped with a CPU having a clock frequency of not less than 166 MHz, an internal memory with a capacity of not less than 16 MB, preferably 32 MB or more, a hard disk unit of not less than 1 GB and a modem, preferably a built-in modem having a communication speed of not less than 28.8 kbps. Moreover, said computer is preferably of low power consumption and small heat generation. Thus, for example, the relevant components used in the notebook-sized portable computer can be utilized.

In the present invention, said computer optionally has an electronic balance weighing-support function, a color simulation function, a weighing candidate selection function, a calorimetric function, a color difference measuring function, a product lot management function, an authoring function, a remote maintenance function, etc. The electronic balance weighing-support function mentioned above comprises an electronic balance-associated weighing function, an electronic balance-associated color simulation function, a data file registration function, etc. and is able to expedite construction of said learning reference data file.

The color simulation function mentioned above is a function such that in the process of weighing out paint components with the electronic balance according to the formulation determined by the color matching computation, the predicted reproduction color corresponding to the formulation during weighing and the target color can be indicated in parallel in real time on the color display for each viewing angle. By this function, the color corresponding to the in-process formulation during weighing can be instantly computed and displayed in comparison with the target color, thus enabling the user to visually assess the degree of approach to the target color and, hence, attain an adequate paint formulation with increased efficiency. This parallel display including the target color may for example be a concurrent side-by-side display of the target color and predicted reproduction color, for example in terms of the color in the highlight direction, the color in the shade direction and the averaged color. Furthermore, the color values at respective viewing angles can be linearized into a continuum by interpolation for each given range of viewing angle and displayed as a panel.

Figure 5:
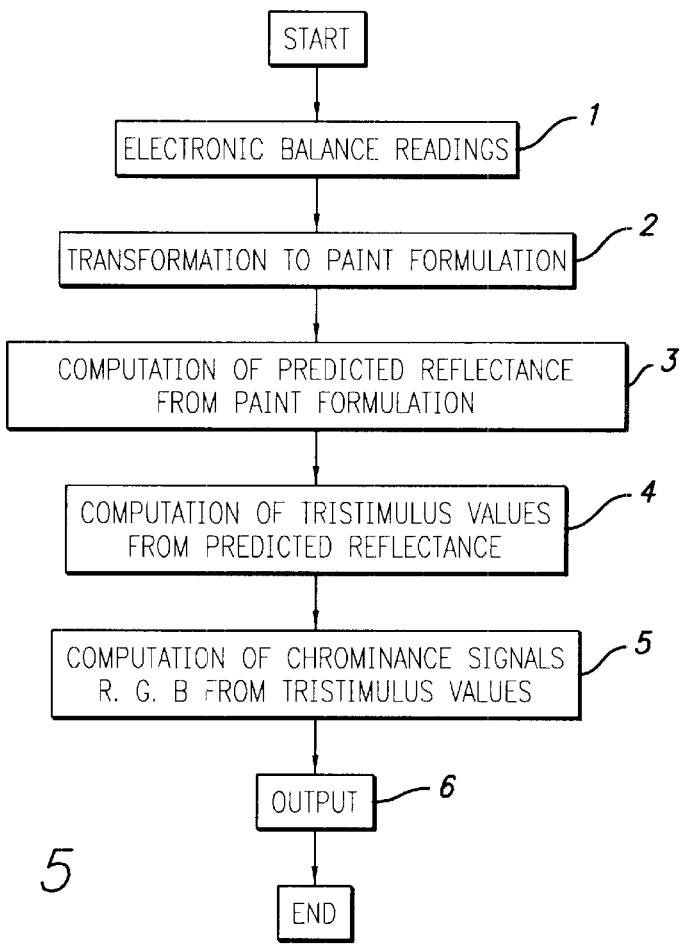
FIG. 5 is a schematic diagram showing the color simulation function of the color matching apparatus according to the present invention.

The color simulation function mentioned above reads weight values from said electronic balance, transforms the values into a paint formulation and computes the predicted spectral reflectance corresponding to the particular formulation as illustrated in FIG. 5. Based on this predicted spectral reflectance, the tristimulus values $X(\theta)$, $Y(\theta)$ and $Z(\theta)$ are computed and, furthermore, the chrominance signals $R(\theta)$, $G(\theta)$ and $B(\theta)$ are computed. In the above parameters, $\theta$ represents the viewing angle.

The computation candidate selecting function mentioned above operates as follows. A plurality of formulating recipes may exist for colorants and metallic or pearlescent pigments which can implement the same chromaticity as a coated color specimen and, depending on the kind of metallic or pearlescent pigment, there may be a plurality of formulations, within the same recipe, which will give the same flop value. In case a plurality of results are obtained by said color matching computation, this function can be used to evaluate and select the optimum value taking metamerism, cost and other factors into consideration. In the present invention, as such formulation candidates, 5 formulations, for instance, can be determined.

The colorimetric function mentioned above is, a function which is used to control the measurement of light by the spectrophotometer used for measuring the color of a metallic or pearlescent paint film, for example a multiangle spectrophotometer or a goniospectrophotometer. The color difference measuring function, also mentioned above, is a function which assesses the degree of agreement between a paint prepared according to the predicted formulation and the sample and, also, to evaluate the reproducibility of data.

The product lot management function mentioned above is a function which controls the release of products for shipment and can be used in the management of shipping histories. The authoring function, also mentioned above, is a function which is used for education and training and, in addition, is capable of providing technical information and sample data as necessary. The remote maintenance function mentioned above is a function by which maintenance work on the apparatus can be carried out by remote control via a communication line.

The type of color display in the present invention is not particularly restricted but may be any device which can be connected to a computer and is able to display information in color, for example a CRT or a liquid crystal display (LCD). Use of an LCD contributes to size reduction of the apparatus. Moreover, the color display in the present invention is preferably of the touch panel type which facilitates operation of the color matching apparatus of the invention. The touch panel display is preferably an ultrasonic scanning type with a glass surface structure which can be easily cleaned of soils and deposits due to scatterings with, for example, an organic solvent during the paint weighing operation. Incidentally, in the present invention, a touch panel display for facilitating the color matching operation as mentioned above may be provided independently of the a color display described hereinbefore.

The spectrophotometer for use in the present invention is not particularly restricted provided that it permits colorimetry at a plurality of viewing angles within the visible region of the spectrum. The preferred spectrophotometer, however, comprises a docking station, a color measuring unit and a battery which has been built in said color measuring unit and is chargeable during the period in which the color measuring unit set on said docking station remains connected to an external power supply and, as the color measuring unit is re-set on said docking station after the color measurement in its detached condition, is not only capable of transmitting colorimetric data to the computer but also capable of measuring the sample coated plate even while said color measuring unit remaining set on the docking station. The color measuring unit mentioned above is a spectrocolorimetric unit having a measuring head, which can be set on said docking station or disconnected from the station, held with a single hand or both hands and applied against the object of colorimetry. The plurality of viewing angles mentioned above are preferably 20°, 45°, 75° and 110° with the direction of specular reflection, for example when the illumination angle is 45° with the direction normal to the specimen surface. When the measurement of light is possible at those 4 angles, the luster of the metallic or pearlescent pigment can be accurately reflected in the determination. In the case of circular illumination, the illumination is performed at the angles of 20°, 45°, 75°, etc. with respect to the direction normal to the specimen surface and received in said normal direction.

The electronic balance for use in the present invention is not particularly restricted provided that it can be used as connected to a computer but is preferably one having an RS-232 port for connection to a computer and a minimum reading limit of about 0.1 g.

Of the color matching apparatus according to the present invention, at least said computer and display are preferably enclosed in a solvent-resistant housing. The housing mentioned just above may for example be a stainless steel housing or a housing made of solvent-resistant resin. Moreover, when said color display is an LCD, its surface is preferably made of a solvent-resistant material such as glass. The exterior of said color measuring unit is also preferably made of solvent-resistant resin.

The color matching apparatus according to the present invention may be optionally equipped with other accessory devices such as a printer and an automatic colorant feeder unit.

The color matching apparatus according to the present invention, wherein the color matching computation system capable of carrying out a color matching computation for an automotive repair paint either containing or not containing a luster component and the color data file are installed on a computer, is capable of outputting the result of the color matching computation for an automotive repair paint either containing or not containing a luster component in a response time of as short as about 3~60 seconds in response to a computation command. Furthermore, the color matching apparatus of the present invention is such that by connecting it to a database server through a communication channel, at least paint component base data and automotive top coat formulation base data can be retrieved and used in said color matching computation so that the constantly updated data can be reflected in the output. Moreover, because the database on the computer need not be so large, the information storage unit, CPU, etc. are protected against overloading and an ordinary personal computer can be sufficient to deal with the necessary operation.

Moreover, the color matching computation system for determining an adequate paint formulation containing pluralities of colorants and metallic or pearlescent pigments performs a predictive computation giving the target spectral reflectance and target flop value taking into account the change in spectral reflectance at each viewing angle owing to addition of a luster component and, using the goniospectral reflectance data generated with varied colorant-metallic or pearlescent pigment formulations and coating conditions, applies a fuzzy logic as a computation means for enhancing the accuracy of color matching by correcting for the difference from the computed color matching data, with the result that a predicted spectral reflectance value can be computed with sufficiently high accuracy even using the spectrometric data at, for example, 3~4 viewing angles. This means that it is no longer necessary to repeat many a correcting computation but a paint formulation can be determined with high accuracy and dependability over a broad range of coated color without calling for extraordinary skill. Thus, the formulating work which required at least about one hour in the past can now be completed within about 20 minutes. Furthermore, since the calorimetric parameters after application of a clear coating can be predicted from the calorimetric data of a base coating layer not covered with the clear coating, the clear coating process can be omitted to shorten the work time.

Furthermore, by virtue of said color simulation function, the color corresponding to a given formulation in the course of weighing out can be computed in an instant and displayed in parallel with the target color, so that a more efficient paint formulation work can be realized by visual monitoring of the degree of approach to the target color without adversely affecting the characteristic of color matching which is inherently a sensorial operation.

The color matching apparatus of the present invention, at least the computer and color display of which are accommodated in a solvent-resistant housing, is excellent in respect of durability, maintenance, installation space and workability.

EXAMPLES

The following examples are further illustrative of the present invention, it being to be understood, however, that the scope of the invention is by no means defined by those examples.

Example 1

A personal computer (CPU 166 MHz, memory 32 MBs Windows 95 installed), a liquid crystal full-color display, a spectrophotometer (MacBeth) comprising a docking station and a color measuring unit, and an electronic balance (Sartorius; minimum weighing limit 0.1 g, maximum weighing limit 7.2 kg) were set in position and the personal computer was loaded with a fuzzy logic color matching computation system adapted to perform a color matching computation for a metallic or pearlescent pigment-containing paint, a database reference system, and a color data file for metallic or pearlescent pigments and colorants.

Construction of the Database

The color data file for metallic or pearlescent pigments and colorants was entered with colorimetric data on the colorants and metallic or pearlescent pigments shown in Table 1 at the concentrations also indicated in Table 1.

TABLE 1

| Paint component | | Concentration (%) |
|---|---|---|
| Colorants | Cyanine blue | 0, 2.99, 9.99, 29.99, 100.00 |
| | Shadow green | 0, 3.00, 10.10, 29.77, 100.00 |
| | Tinting black | 0, 3.03, 10.39, 29.91, 100.00 |
| Metallic pigments | Aluminum, fine-mesh | 0, 1.06, 3.06, 5.03, 7.06, 10.01, 20.41, 29.83, 49.83, 69.80, 100.00 |
| | Aluminum, medium-mesh | 0, 1.02, 3.04, 5.00, 7.00, 9.99, 19.96, 30.02, 50.03, 69.86, 100.00 |
| | Aluminum, coarse-mesh | 0, 1.00, 3.06, 5.01, 7.02, 10.00, 20.06, 30.03, 50.18, 70.03, 100.00 |

For fuzzy deduction, the file was further entered with calorimetric data on 18 kinds of actually coated plates. Colorimetry was carried out as follows. A steel plate pre-coated with a base coat was coated with a metallic paint and using a multiple-angle spectrophotometer (CE-741, MacBeth), measurement was performed over the range of 400~700 nm at 10 nm intervals at the viewing angles of 20°, 45° and 110° with the direction of specular reflection.

Execution of Color Matching

After the target coated color was measured with the spectrophotometer, the spectrophotometer was set on the docking station and the data were inputted into the computer. Then, a command for formulation computation was entered. The result of an initial computation was outputted in about 10 seconds after entry of the command. Based on the result of computation, the paint components were weighed out with the electronic balance to prepare a paint. A coated plate was prepared with this paint in the same manner Δas the target coated plate. This coated plate was measured and the color difference ΔE from the target color was determined. The results are shown in Table 2. The predicted formulation obtained is shown in Table 3.

Then, a correction computation was performed on the basis of the above initial computation data. The results of this second computation were obtained in about 8 seconds after entry of the instruction. Based on the results, the components were weighed out with the, electronic balance to prepare a paint. Using this paint, a coated plate was prepared in the same manner as the target color specimen. This coated plate was measured and the color difference ΔE was computed. The results are shown in Table 2. The predicted formulation obtained is shown in Table 3. The relative error of the predicted formulation after the correction computation as compared with the target formulation was within 3%.

The color of the predicted formulation during said weighing was displayed in parallel with the target color for each of the highlight direction, front direction and shade direction and visually monitored on the color display.

TABLE 2

| Viewing angle | CIE L*a*b* | Target color | Initial data | Data as corrected |
|---|---|---|---|---|
| 20° | L* | 97.63 | 96.74 | 98.95 |
| | a* | −32.17 | −34.55 | −30.74 |
| | b* | −16.05 | −17.20 | −15.69 |
| | ΔL* | — | −0.89 | 1.32 |
| | Δa* | — | −2.38 | 1.43 |
| | Δb* | — | −1.15 | 0.36 |
| | ΔE* | — | 2.79 | 1.98 |
| 45° | L* | 53.88 | 52.55 | 54.11 |
| | a* | −21.53 | −22.46 | −20.56 |
| | b* | −14.62 | −15.41 | −14.23 |
| | ΔL* | — | −1.33 | 0.23 |
| | Δa* | — | −0.93 | 0.97 |
| | Δb* | — | −0.79 | 0.39 |
| | ΔE* | — | 1.80 | 1.07 |
| 100° | L* | 25.23 | 24.27 | 25.40 |
| | a* | −12.61 | −12.02 | −11.68 |
| | b* | −14.69 | −15.35 | −14.29 |
| | ΔL* | — | −0.96 | 0.17 |
| | Δa* | — | 0.59 | 0.93 |
| | Δb* | — | −0.66 | 0.40 |
| | ΔE* | — | 1.31 | 1.03 |

TABLE 3

| | Paint component | | Target color | Initial data | Data as corrected |
|---|---|---|---|---|---|
| Formulation (weight parts) | Colorants | Cyanine blue | 14.00 | 13.96 | 13.20 |
| | | Shadow green | 6.00 | 5.89 | 5.44 |
| | | Tinting black | 0.00 | 0.00 | 0.27 |
| | Metallic pigments | Aluminum, fine-mesh | 50.00 | 33.22 | 47.68 |

TABLE 3-continued

| Paint component | Target color | Initial data | Data as corrected |
|---|---|---|---|
| Aluminum, medium-mesh | 0.00 | 18.90 | 1.88 |
| Aluminum, coarse-mesh | 30.00 | 22.35 | 30.23 |

The ΔE of the result of correction in Table 2 was 1.98 at 20°, 1.07 at 45° and 1.03 at 110°. Those values are differences of practically negligible order and, in the comparative indication on the display, are of the visually indiscriminatable order.

Example 2

With the coated color of a car which was 4 years after factory coating being used as the target color, a formulation computation was carried out using the apparatus of Example 1. The personal computer was connected via a modem (33.6 kbps) to a separately prepared server carrying the formulation data relevant to the particular car and this server-supplied formulation information was used in the computation. The car formulation data utilized are shown in FIG. 4. When a command was entered for a computation utilizing said formulation of Table 4 as initial data, the predicted spectral reflectance was obtained within about 1 second. The color difference ΔE from the coated color aged 4 years was 2.8. Then, a command was given for correction using the above formulation as initial data. As a result, a corrected formulation was obtained in about 4 seconds. Based on the result of this computation, a paint was prepared by weighing out the components with the electronic balance. Then, using this paint, a coated plate was prepared. The color difference ΔE between this coated plate and the target color sheet was 1.0.

TABLE 4

| Original | Formulation (parts) |
|---|---|
| Indanthrene blue | 715.0 |
| Hi-spark, ultrafine | 180.0 |
| Cyanine blue | 100.0 |
| Tinting black NP | 5.0 |

With the apparatus of Example 1, the result.of correction computation could be obtained in about 5 seconds inclusive of the initial computation time and a coated color conforming to the target color with high precision could be reproduced. Furthermore, by connecting the apparatus to a server carrying the formulation information on the car to be repaired, a highly accurate formulation could be easily predicted with the personal computer.

EFFECT OF INVENTION

In accordance with the present invention, a highly accurate formulation can be computed in a short response time for an automotive repair paint either containing or not containing metallic or pearlescent pigments, and because of only a few correction computations needed, the formulation time can be drastically reduced. Moreover, the formulation work which called for much skill and experience in the past can now be easily carried through even by the novice.

Furthermore, in the formulation of a plurality of metallic or pearlescent pigments and a plurality of colorants, the coated color of both of solid paint and a metallic-pearlescent paint can be freely matched to an target color virtually without limitation in hue and luster. In addition, since the database can be supplemented and updated on-line, a high quality automotive repair job can be accomplished on the basis of the up-to-the minute technical information at all times.

What is claimed is:

1. A color matching apparatus for automotive repair paints which comprises a computer, a color display, a spectrophotometer capable of color measurement at a plurality of viewing angles, and an electronic balance wherein said color matching apparatus is provided, as installed on said computer, a color matching computation system capable of performing a color matching computation for said automotive repair paint, a color data file and a database reference system capable of referring to a remote database server for retrieval of at least paint component base data and automotive top coat formulation base data via a communication channel and, in response to a computation command, is capable of carrying out said color matching computation for said automotive repair paint on the basis of colorimetric data obtained from said spectrophotometer and color data in said color data file and outputting the result of said color matching computation to said color display and electronic balance, with said apparatus, upon connection to the database server via said communication channel, being enabled to retrieve at least said paint component base data and automotive top coat formulation base data and use them in said color matching computation, wherein said color matching computation system is adapted to perform a predictive computation of a formulation giving a target spectral reflectance and a target flop value on the basis of calorimetric data obtained from said spectrophotometer and color data in said color data file taking into account the change in spectral reflectance at a metallic or pearlescent pigment, and the result of said predictive computation is corrected by a fuzzy deduction algorithm by using spectral reflectance data at a plurality of viewing angles as generated with a plurality of sample plates prepared according to varied formulations of colorant and metallic or pearlescent pigments under varied coating conditions as previously stored in a computer memory.

2. The color matching apparatus for automotive repair paints according to claim 1 wherein said color matching computation system performs said color matching computation taking into account the fading of coating of an automobile to be repair-coated using the automotive paint formulation data and calorimetric data retrieved from said database server.

3. The color matching apparatus for automotive repair paints according to claim 1 wherein said color matching computation system uses, in performing said color matching computation, the automotive top coat formulation data and calorimetric data retrieved from said database server as the information for enhancing the accuracy and speed of said color matching computation.

4. The color matching apparatus for automotive repair paints according to claim 1 wherein, in a stage where the components to be formulated are weighed out with said electronic balance according to a predicted formulation determined by said color matching computation, the predicted reproduction color corresponding to a formulation in the course of said weighing is displayed in real time on a color display in parallel with a target color for comparison.

5. The color matching apparatus for automotive repair paints according to claim 1 wherein said spectrophotometer comprises a docking station and a color measuring unit comprising a battery, wherein said battery is rechargeable while said color measuring unit is set in said docking station and remains connected to an external power supply wherein said color measuring unit is capable of measuring the color of a sample plate even in the condition of said color measuring unit remaining set on said docking station.

6. The color matching apparatus for automotive repair paints according to claim 1 further comprising a goniospectrophotometer adapted to generate goniospectral reflectance data on a metallic or pearlescent pigment-containing paint film color and using said data in said color matching computation.

7. The color matching apparatus for automotive repair paints according to claim 1 wherein at least said computer and color display are enclosed in a solvent-resistant housing.

8. The color matching apparatus for automotive repair paints according to claim 1 wherein said housing is made of stainless steel, said color display comprises a touch panel made of solvent-resistant material, and the exterior of said measuring unit of the spectrophotometer color is made of solvent-resistant resin.

9. The color matching apparatus for automotive repair paints according to claim 8 wherein said touch panel is a panel of the ultrasonic scanning type.

10. The color matching apparatus for automotive repair paints according to claim 7 wherein said computer is a computer of low power consumption and small heat generation.

* * * * *